E. R. ROYSTON.
PROCESS OF TREATING SALT.
APPLICATION FILED MAY 19, 1908.
989,056.
Patented Apr. 11, 1911.
5 SHEETS—SHEET 1.
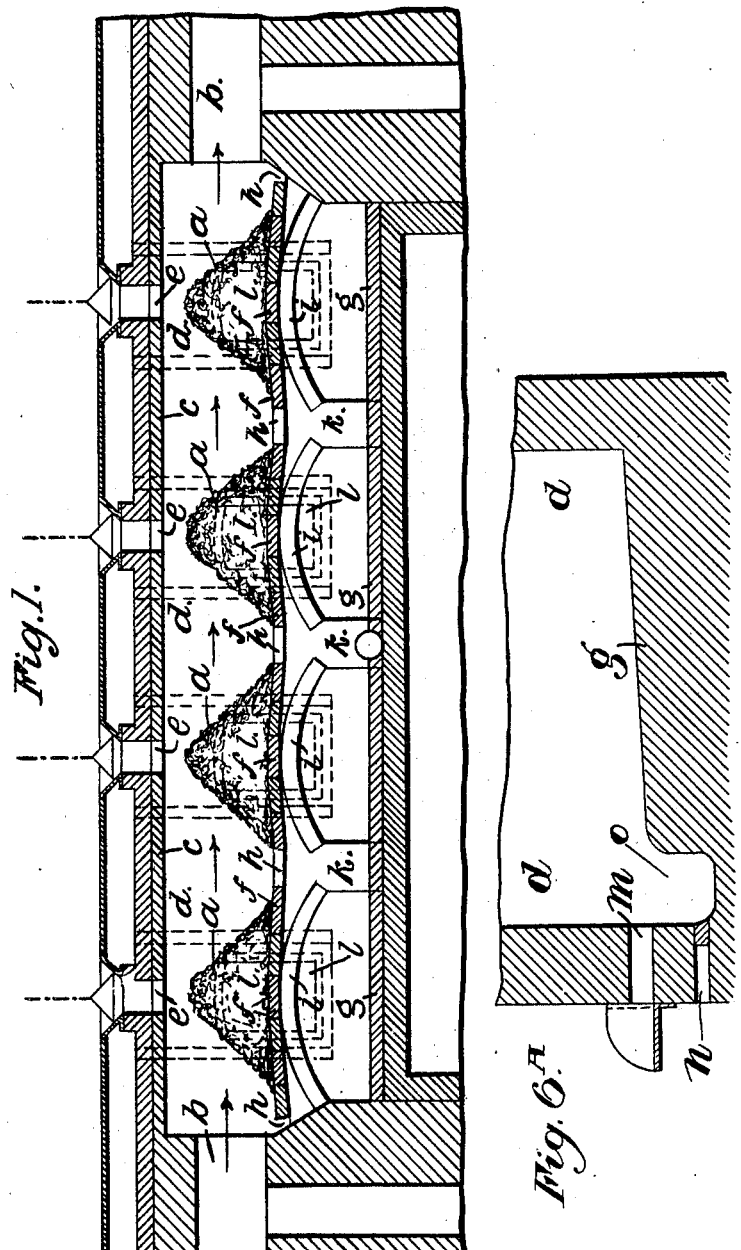
WITNESSES
W. P. Burke
W. G. Smith.
INVENTOR
Ernest Richard Royston E. R. ROYSTON.
PROCESS OF TREATING SALT.
APPLICATION FILED MAY 19, 1908.
989,056.
Patented Apr. 11, 1911.
5 SHEETS—SHEET 2.
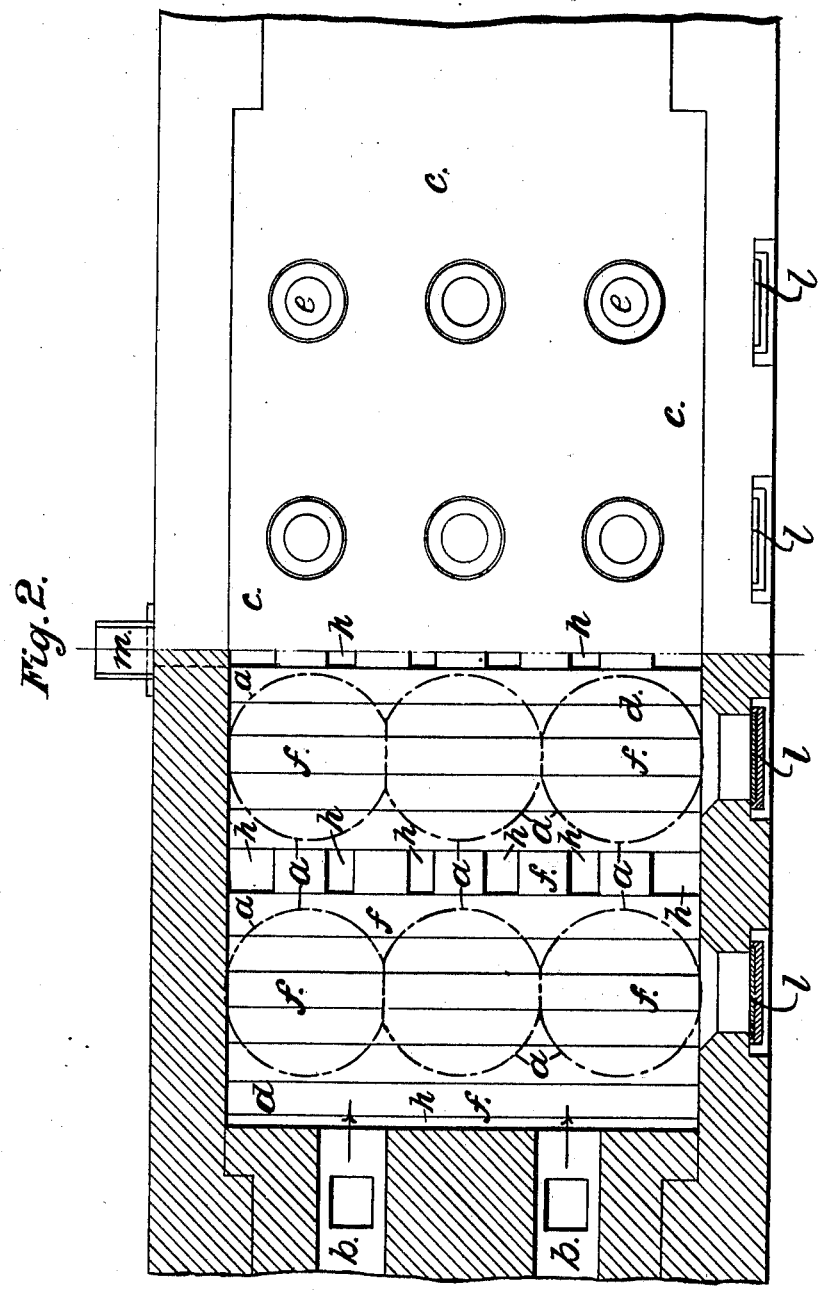

E. R. ROYSTON.
PROCESS OF TREATING SALT.
APPLICATION FILED MAY 19, 1908.
989,056.
Patented Apr. 11, 1911.
5 SHEETS—SHEET 3.
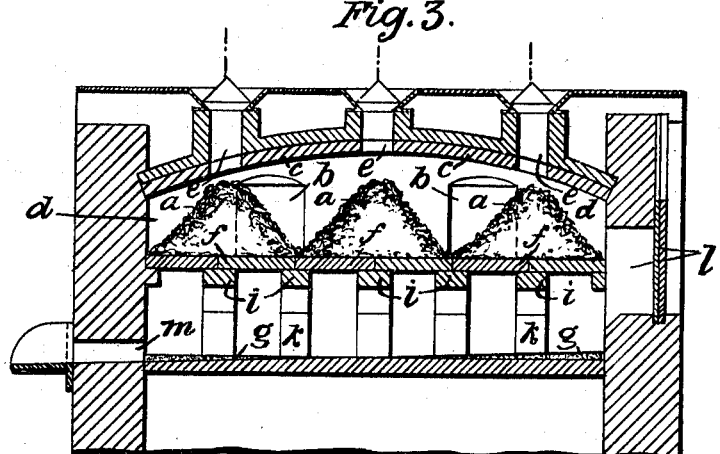
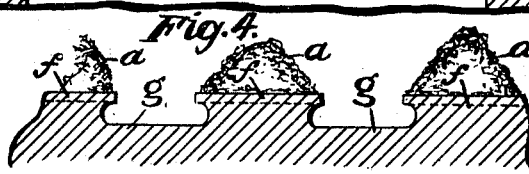
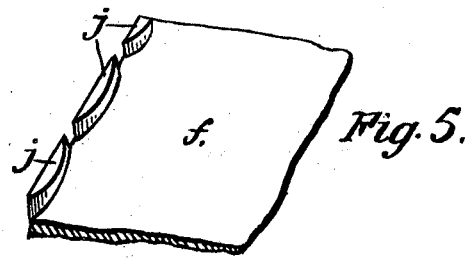
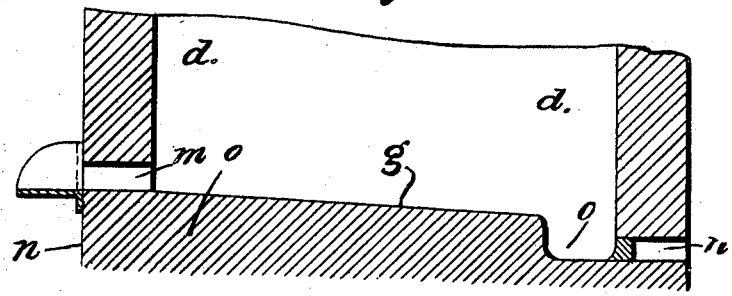
WITNESSES
W. P. Burke
W. G. Smith
INVENTOR
Ernest Richard Royston E. R. ROYSTON.
PROCESS OF TREATING SALT.
APPLICATION FILED MAY 19, 1908.
989,056.
Patented Apr. 11, 1911.
5 SHEETS—SHEET 4.
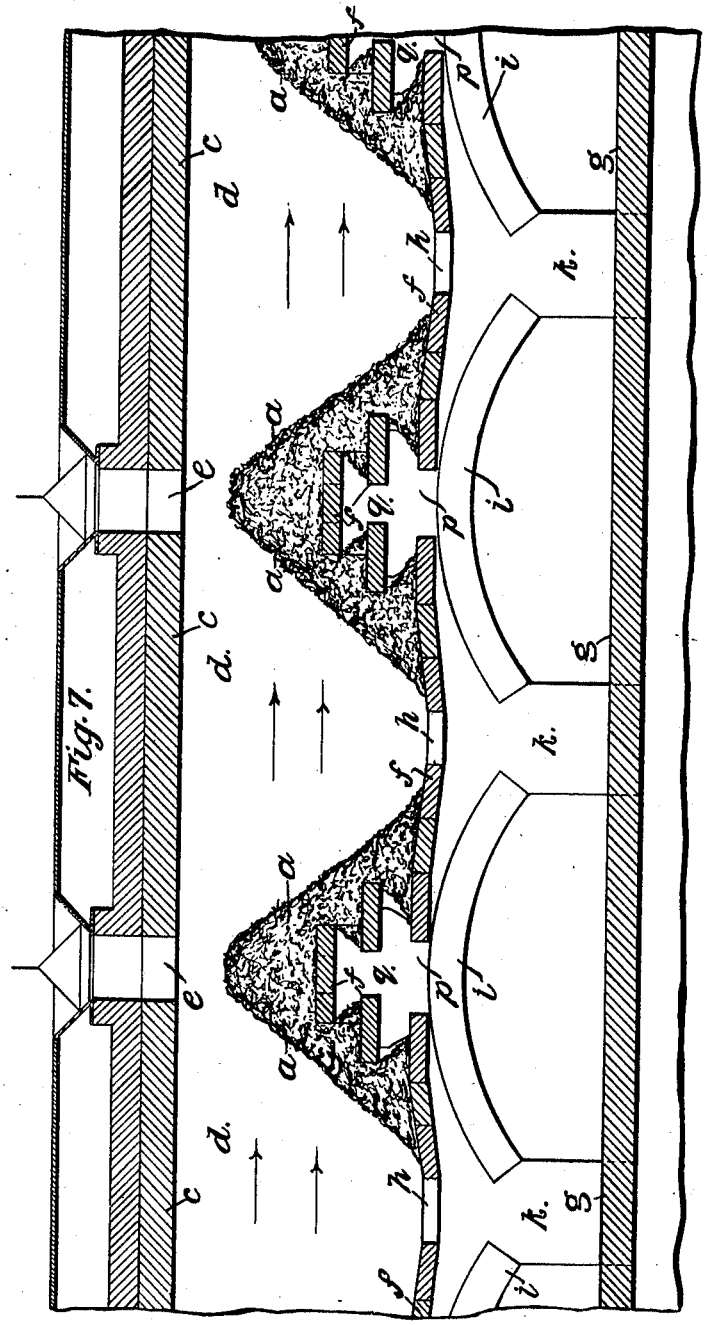
WITNESSES
INVENTOR E. R. ROYSTON.
PROCESS OF TREATING SALT.
APPLICATION FILED MAY 19, 1908.
989,056.
Patented Apr. 11, 1911.
5 SHEETS—SHEET 5.
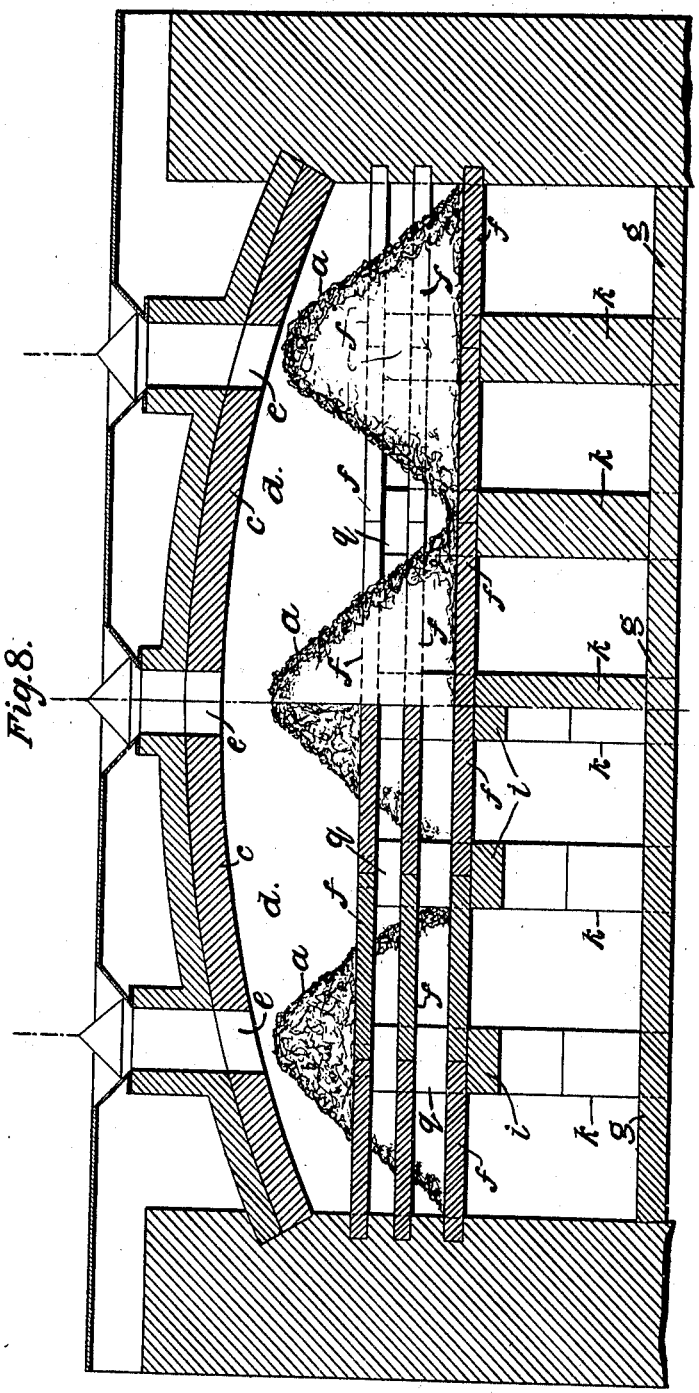
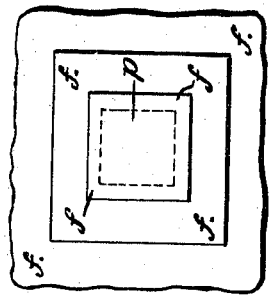
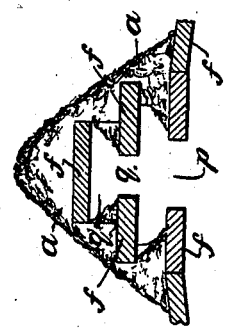
WITNESSES
W. P. Burke
W. G. Smith
INVENTOR
Ernest Richard Royston
ATTY

UNITED STATES PATENT OFFICE.

ERNEST RICHARD ROYSTON, OF OXTON, BIRKENHEAD, ENGLAND, ASSIGNOR TO INTERNATIONAL SALT COMPANY LIMITED, OF LONDON, ENGLAND.

PROCESS OF TREATING SALT.

989,056.  Specification of Letters Patent. Patented Apr. 11, 1911.

Application filed May 19, 1908. Serial No. 433,793.

*To all whom it may concern:*

Be it known that I, ERNEST RICHARD ROYSTON, subject of the King of England, residing at Oxton, Birkenhead, in the county of Cheshire, England, have invented new and useful Improvements in Processes of Treating Salt, of which the following is a specification.

This invention has reference primarily to the production or manufacture of pure white salt (chlorid of sodium) from impure and discolored rock salt or other salt by the fusion process; and it has for some of its objects and effects, to provide improvements in connection with such process, by which the melting may be rendered rapid, the consumption of fuel small, and high liquidity in the molten salt may be obtained.

In the following description of the process of, and plant or apparatus for melting salt, the invention hereunder is comprised; and it is illustrated in the annexed drawings, in which—

Figure 1 is a longitudinal section through a furnace hereunder; Fig. 2 is a plan, half in section of same; and Fig. 3 is a cross section of same. Figs. 4, 5, 6 and 6ᴬ, are detail views showing modifications of parts of the furnace. Fig. 7 is a longitudinal section; and Fig. 8 is a cross section showing the arrangement in which the supporting surfaces for the rock salt are in the form of trays or shelves. Figs. 9 and 10 are elevation and plan showing modifications of the arrangement illustrated in Figs. 7 and 8.

The salt to be melted is supplied at a plurality of points onto a surface within the furnace, in such a manner as to form it into a plurality of piles, so that there will be several rows of piles, and they will occupy practically the whole horizontal area of the furnace; and the melting gases are introduced and passed at their initial or maximum temperatures directly onto the outside surfaces of said piles. In some cases however, the piles are, by the construction hereinafter described, more or less hollow, and the gases not only act, first, on the outside surfaces of said piles, but also on the interior of same. Furthermore, under the invention, the surface on which the salt is melted is so arranged that it stands above the melted salt, which runs away as melted; the melting gases being passed over the outer surface of the salt without having to pass through the salt.

The furnace—which will be of the reverberatory type—has a platform, table, or shelves, onto which the salt is introduced, and which is disposed over the bottom of the furnace chamber; and the bottom of the furnace chamber, beneath the platform, table, or shelves, serves as a receiving and holding bath or vessel for the molten salt; and in this furnace, the platform, table, or shelves, or the lower portion of same, protects the molten salt which collects beneath same from the excessive heating by the hot gases, which are first introduced onto the salt above.

Further characteristics of the invention will be described in the description of the various figures of the drawings.

By the improvements, while the melting of the salt is rapid, and the consumption of fuel small, the salt on the bottom or bed of the furnace will be brought to and kept in a highly liquid state. Furthermore, by the process and furnace herein described, the complete operation of melting is rapidly effected without raking, or the like, or any hand labor; and the salt may be fed into the furnace mechanically in any suitable known way.

Referring to Fig. 1, the salt is supplied and subjected to heat in a plurality of piles $a$, the exteriors of which are acted upon directly by the heating gases, supplied above the surface on which these piles rest, through ports $b$ in the walls of the furnace chamber $d$; the salt being introduced into the furnace chamber $d$ through openings $e$ in the roof $c$, and practically all over the whole of the horizontal area of the furnace. By this manner of heating and melting salt, the rate of melting within a given time is rendered very high, while the consumption of fuel is relatively low.

In Figs. 1 to 3, the piles $a$ are supplied over the whole area of, and supported upon a horizontal platform $f$, raised above the bottom $g$ of the furnace, to which the molten salt from the platform $f$ runs directly as it melts, through apertures $h$. The platforms $f$ are supported from the bottom $g$ by arches $i$, carried by columns $k$; the arches running lengthwise of the furnace in the case shown, and pitched apart at suitable distances.

The melted salt may collect on the hearth $g$ directly beneath the platform $f$ and is there shielded by it, and out of the direct current of heat, and so volatilization of the molten salt, which takes place at the temperature of melting, is prevented. At the same time, the salt as it leaves the platforms $f$ is in a highly fluid state, and keeps in this state of high fluidity, which is necessary, especially where it has to be subsequently operated upon, as by being acted upon by forcing air through it, or by mechanically stirring it or otherwise,—for its purification after it has been tapped from the furnace. Hence by this condition of high fluidity obtained as described, plenty of time is afforded for these subsequent operations upon the molten salt to be accomplished, before it—the fluidity of the salt—is materially reduced. If the fluidity is substantially reduced in the vessel in which the subsequent operations are conducted, the power of producing pure white salt is gone.

In the modified arrangement shown in Fig. 4, the platforms or surfaces $f$ on which the salt rests, are solid raised parts, and the molten salt which runs from the piles upon them, runs into and collects on the hearth or solid bottom $g$, which lies below the level of these raised platforms or surfaces.

In some cases, all the fused salt will be retained on the hearth $g$; but if desired, it may be partly or wholly run from same, as it reaches it, through the tap hole $m$; or, to a sunk well or receiver.

When rock salt is being melted a large proportion of the earthy matter contained in it will be retained upon the platforms $f$, which can be removed by scraping it off by rakes introduced through the doorways and doors $l$, through which also access to the bottom $g$ is had, for cleaning.

The platform $f$ may be provided with raised edge parts $j$, as shown in Fig. 5, at suitable intervals, to prevent the earthy matters from being carried off with the salt.

A modified mode of separating the earthy impurities from the liquid salt within the furnace, is illustrated in Fig. 6, in which the floor $g$ is inclined downward away from the tap hole $m$, so that the residue gravitates down the bottom $g$ toward the lowest point, and is run off—after tapping of the molten salt through the tap hole $m$—through a separate tap hole $n$ in the side wall of the furnace; and a sump $o$ or sumps $o$, is or are provided in this lower part, in which the heavy earthy residue or impurities will collect. Or, the hearth may be inclined, as shown in Fig. 6A, and after tapping the molten salt, the residue may be removed from the sumps through tap holes $n$ below $m$.

If it should be desired for special reasons, to melt the salt on the platform or surface at an even depth, it will have to be distributed by rakes, or the like, through the doorways $l$.

In Figs. 7 and 8, the salt is supplied onto a plurality of interspaced trays $f$, with spaces between them, so that the salt is in the form of a plurality of hollow conical piles, upon the exterior of which the melting gases at their initial or maximum temperature, first act, and do most of the melting; while a very substantial additional melting is also effected by the gases having access to the interior of the piles, by way of the spaces between the trays or shelves $f$, and without having to pass through the body of salt, which is impossible in practice. The melted salt from the outside, flows down over the piles into the hearth or bottom $g$, beneath the trays $f$, through the openings $h$, while that melted on the inside, flows down through the openings $p$ in the table $f$, into the hearth.

Where only one set of trays is employed, or where a number of sets are used, and separated by division walls, instead of their being arranged as shown in Figs. 7 and 8, they may be arranged so that the upper ones start from the walls, and the lowermost one is at the center; all being spaced apart as regards the horizontal position, similarly as in Figs. 7 and 8. Of course there may be any number of trays according to the size of furnace.

In the modification shown in Figs. 9 and 10, the trays $f$ instead of being continuous, are arranged either in rectangular form, as shown, or in circular form, one of such sets of trays being disposed under each of the supply apertures $e'$ in the roof.

What is claimed is:—

1. In a process for melting salt and maintaining the melted salt in a molten condition, subjecting quantities of unmelted salt to heating gases for melting it, arranging the quantities to enable the melted salt to flow from the unmelted salt, and maintaining the melted salt in a molten condition by heating gases of a lower degree of temperature than the melting gases and below the degree of temperature at which salt volatilizes.

2. In a process for melting salt and maintaining the melted salt in a molten condition, forming unmelted salt in a plurality of heaps, subjecting the exposed surfaces of the unmelted salt to the action of heating gases for melting it, enabling the melted salt, as it is melted, to run from the unmelted salt, and maintaining the melted salt in a molten condition by heating gases of a lower degree of temperature than the melting gases.

3. The process for melting salt and maintaining it in a molten condition, comprising forming unmelted salt in a plurality of heaps, subjecting the exposed surfaces of the salt heaps to heating gases at maximum temperature, melting the salt by the gases at maximum temperature, enabling the melted salt to run from the unmelted salt, collecting the melted salt, and maintaining the collected melted salt in a molten condition by heating gases of a lower degree of temperature than the gases of a maximum degree of temperature and below the degree of temperature at which salt volatilizes.

In testimony whereof I have signed my name to this sepcification in the presence of two subscribing witnesses.

ERNEST RICHARD ROYSTON.

Witnesses:
SOMERVILLE GOODALL,
WALTER M. HARRISON.

Copies of this patent may be obtained for five cents each, by addressing the "Commissioner of Patents, Washington, D. C."